3,429,823
PAINT COAGULATOR COMPOSITIONS

Ralph J. Cataneo, Brooklyn, N.Y., assignor to Oakite Products, Inc., New York, N.Y., a corporation of New York
No Drawing. Filed Feb. 4, 1963, Ser. No. 256,120
U.S. Cl. 252—170          21 Claims
Int. Cl. C09d 9/00; B08b 3/08

This invention is that of a so-called paint-coagulator composition containing primarily a minor portion of a dialkyl ketone dissolved in a generally major portion of a water-insoluble solvent vehicle for it, which is lighter than water. This liquid then can spread out and float as a layer on the surface of the water in the tank holding the water used to provide the continuous water curtain running down the back wall of the paint-spray booth to withdraw and direct into that tank the overspray paint particles which miss the articles being spray-painted.

This layer of the paint-coagulator composition thus floating on top of the water supply serves then to receive and contact the thus withdrawn overspray paint particles and to destroy their original tacky film-forming property.

Thus when the overspray paint particles contact and mingle with this coagulator composition, as it is agitated by the water curtain falling down through it, they lose their sticky tackiness and form brittle, readily frangible and disintegratable clusters and agglomerates of a non-tacky material of a generally granular character. That material appears to be composed of the pigment mixed up in brittle, so to speak, de-tackified or coagulated original film-forming constituent of the paint and floats on top of the layer of paint-coagulator on top of the water. From there it is skimmed off readily at intervals.

Attempts to overcome the problems involved with suitable disposal of paint-booth overspray have met with only quite limited success. In some cases finely divided inert adsorbents, such as asbestine, bentonite, graphite, and others were used to seek to attract residual liquid vehicle of the paint spray particles and at the same time to provide a coating about their solid content. This not only required adding relatively large quantities of these adsorbent particles to the spray booth water system, but also gave unsatisfactory results in addition to the cost of consumption of the required large quantities of such adsorbents.

Another approach involved use of a mineral oil embracing an emulsion of soluble oil in water, but this too still fell short of the needs.

Other attempts include use of chemical agents which are highly alkaline, for example, by including sodium hydroxide or other alkali dissolved in the circulating water. These not only are unsatisfactory because they saponify the glycerides of the glyceride oil paints, with which they are for the most part applicable, and thus not only produce soaps with at least some solubility in the circulating water, with resulting increased foaming in it. As the concentration of those soaps increases as the work load continues, they precipitate out and accumulate on exposed surfaces of the water system.

In addition, the operators have to guard against ill effects from handling such alkaline solutions, by using gloves particularly resistant to them. Such alkaline solutions should not be used with aluminum or zinc pigment paints because their reaction with these metal pigments liberates hydrogen with concomitant explosion danger.

Further to the foregoing limitations, the alkaline solutions leave the destroyed paint in rubbery, plastic form which under pressure tends to liberate liquid tacky paint apparently enveloped in the rubbery product.

These and other disadvantages and shortcomings are overcome by the results produced by the paint-coagulator composition of this invention. As already stated, it converts the paint particles to brittle, readily frangible, and easily broken up, disintegratable clusters or agglomerates of a non-sticky, non-tacky material.

Considered broadly, the liquid paint-coagulator composition of the invention is substantially insoluble in water and lighter than it so that it spreads out in a layer and floats on it. It contains primarily from about 3 to about 35 parts, and more practically from about 6 to about 15 parts, of a dialkyl ketone (having a total of from 8 to about 35 carbon atoms) dissolved in from about 96 to about 60, and more effectively from about 96 to about 85 parts, of an organic, substantially water-insoluble solvent vehicle which dissolves the ketone without reacting with it, gives the composition a flash point of at least about 100° F., is light enough to float on water with the ketone dissolved in it, is hydrocarbon, chlorinated hydrocarbon, or a polyester of fatty acids with aliphatic polyols, or any mixture of any of them.

To avoid any kind of accumulation of any of the waste products on any part of the walls of the tank for the water curtain water, it is beneficial to include also a wetting agent component. This more advantageously should be nonionic, although it can be predominately so. The wetting agent component also should be both lipophilic and hydrophilic, but predominately the former, and particularly so to hold foaming below a point where it can be disadvantageous. At least about one-half of the wetting agent component should be a low-foaming wetting agent.

The wetting agent component may well comprise more than one such agent, all of which more effectively should be nonionic. Then one of them can be selected especially to be effective against foaming. In such case merely two wetting agents are preferable. Then in some cases, one of them, but only as a minor component, may be either anionic or cationic. Ordinarily, the total wetting agent component may amount to about one percent. Two percent or more may be used, although generally no particular advantage occurs from exceeding about four percent.

The wetting agent component generally disperses adequately stably in the solution of the ketone in the solvent vehicle for it. However, with some solvents it might occur that some wetting agent may not remain entirely stably homogeneously dispersed after some excessively extended storage period before shipping and use.

To avoid such situation, although it may not significantly interfere with operating effectiveness, it is helpful to include a coupling agent to assure continued complete homogeneity even after such extended storage. Such coupling agent can enhance the temporary partial emulsification of the ketone solution with the water. The coupling agent should be soluble in the solvent vehicle for the ketone, be chemically inert to each of them and also compatible with the wetting agent component and stable to water.

Essential to the paint-coagulator composition of the invention is the dialkyl ketone. It may be balanced or symmetrical such as is diisobutyl ketone, which is especially effective; and stearone, i.e. $(C_{17}H_{35})_2CO$; or unbalanced or non-symmetrical such as methyl heptyl ketone, methyl nonyl ketone, methyl heptadecyl ketone, or others like them.

The solvent for the ketone, as well as for the wetting agent component, and any coupling agent included, should have such flash point that when the entire composition is compounded, the finished paint-coagulator has a minimum flash point of at least about 100° F. Since the final composition need only be substantially insoluble in water and lighter than it to be able to float as a liquid layer over the water supply for the spray booth curtain, there is no critical maximum flash point for it.

Generally an aliphatic solvent vehicle for the ketone is preferred. While of these kerosene is advantageously effective, other aliphatic solvents such as mineral spirits, Stoddard solvent or other such commercial petroleum fraction solvents are suitable, separately or with other such aliphatic solvents.

Aromatic solvents such as toluene and xylene may be used alone or admixed or with any of the aliphatic solvents. Such mixtures can be predominately aliphatic. Also useful are the different glyceride oils preferably those of vegetable origin such as linseed oil, corn oil, cottonseed oil, soyabean oil, and triolein.

Where some selected solvent for the ketone may yield a finished composition with too low a final flash point, such solvent may be replaced in part by any of the others having a higher individual flash point and which thus can raise the flash point of the finished composition to or above the practical minimum.

Any nonionic wetting agent which is predominately lipophilic along with significant hydrophilic activity may be used. Presently preferred among these are the octyl or nonyl, or mixed octyl and nonyl, phenoxy (ethylenoxy)$_n$ ethanols, wherein $n$ can be from 1 to 5 and preferably 1 or 2. Effective examples of these latter are those currently available from Antara Chemicals Inc. under the commercial identification Igepal CO 210 (wherein the figures 21 indicate water-solubility of 21% and hence oil solubility of 79%). Also preferred is octylphenoxy ethylene phenyl ether, available from Rohm & Haas Co. under the commercial designation Triton CF-10.

Preferable among the coupling agents are the mono- and di-(lower)alkyl ethers of (lower)alkylene glycols and diglycols, wherein lower alkyl has from 1 to 7 carbon atoms and the lower alkylene portion has from 1 to 6 carbon atoms.

Especially effective among these are the diethylene glycol mono(lower)alkyl ethers such as diethylene glycol monomethyl ether, diethylene glycol monoethyl ether, diethylene glycol monohexyl ether, dipropylene glycol monomethyl ether, and especially diethylene glycol monobutyl ether; as well as the di(lower)alkylene glycol (lower)alkyl di-ethers such as diethylene glycol diethyl ether, and diethylene glycol dibutyl ether.

Other effective coupling agents are the (lower)alkylene glycol mono(lower)alkyl ethers such as ethylene glycol monomethyl ether, ethylene glycol monoethyl ether, ethylene glycol monobutyl ether, and propylene glycol monohexyl ether.

No special procedure needs to be followed in preparing the compositions of the invention. It may be desirable initially to dissolve the selected ketone in the selected solvent or solvent mixture and then stir in any wetting agent which may be desired to be included, and in the latter case, then to mix in the coupling agent. However, any of the constituents may be added in any order for dispersion in the solvent. Alternatively, all of the ingredients to be used may be introduced into the mixing tank at the same time.

The compositions of the invention are illustrated by, but not restricted to, the following:

Example 1

| | Lbs. |
|---|---|
| Kerosene | 87 |
| Diisobutyl ketone | 9 |

Example 2

| | |
|---|---|
| Kerosene | 87 |
| Diisobutyl ketone | 9 |
| Alkylphenoxy (ethylenoxy)$_n$ ethanol, wherein alkyl is octyl and nonyl, and $n$ is 1 to 2 | 1 |

Example 3

| | |
|---|---|
| Kerosene | 87 |
| Diisobutyl ketone | 9 |
| Alkylphenoxy (ethylenoxy)$_n$ ethanol (as in Example 2) | 1 |
| Diethylene glycol monobutyl ether | 3 |

Example 4

| | |
|---|---|
| Kerosene | 87 |
| Diisobutyl ketone | 9 |
| Alkylphenoxy (ethylenoxy)$_n$ ethanol (as in Example 2) | 0.5 |
| Octylphenoxy ethylenoxy phenyl ether | 0.5 |

Example 5

| | |
|---|---|
| Kerosene | 87 |
| Diisobutyl ketone | 9 |
| Diethylene glycol monobutyl ether | 3 |
| Alkylphenoxy (ethylenoxy)$_n$ ethanol (as in Example 2) | 0.5 |
| Octylphenoxy ethylenoxy phenyl ether | 0.5 |

Example 6

| | |
|---|---|
| Kerosene | 87 |
| Diisobutyl ketone | 9 |
| Ethylene glycol monobutyl ether | 3 |
| Alkylphenoxy (ethylenoxy)$_n$ ethanol (as in Example 2) | 0.5 |
| Octylphenoxy ethylenoxy phenyl ether | 0.5 |

Example 7

| | |
|---|---|
| Kerosene | 87 |
| Methyl heptyl ketone | 9 |
| Diethylene glycol monobutyl ether | 3 |
| Alkylphenoxy (ethylenoxy)$_n$ ethanol (as in Example 2) | 0.5 |
| Octylphenoxy ethylenoxy phenyl ether | 0.5 |

Example 8

| | |
|---|---|
| Kerosene | 87 |
| Methyl heptyl ketone | 9 |
| Ethylene glycol monobutyl ether | 3 |
| Alkylphenoxy (ethylenoxy)$_n$ ethanol (as in Example 2) | 0.5 |
| Octylphenoxy ethylenoxy phenyl ether | 0.5 |

While presently kerosene is deemed the practically most advantageous solvent, in some cases it may be preferred or advantageous to replace it in any of the foregoing examples, in part or as a whole, by a correspondingly effective weight of any one or more of any of the other applicable aliphatic hydrocarbon solvents, or aromatic hydrocarbon solvents, or chlorinated aliphatic or aromatic solvents, or solvent polyesters of fatty acid with aliphatic polyols, or mixture of any of the same or different types of these solvents.

While diisobutyl ketone presently is most effective both as to performance and cost, where desired, and, for example, particularly when methyl heptyl ketone or any of the other ketones herein said to be applicable may be available at a suitably lower cost than at present, the diisobutyl ketone of any of the foregoing examples may be replaced, in part or as a whole, by any of such others.

The diethylene glycol monobutyl ether of Examples 3 and 5, as well as the ethylene glycol monobutyl ether of Examples 6 and 8, may be replaced in part or as a whole by the same weight of the other one of them or any other one of the mono- and di-(lower)alkyl ethers of (lower)alkylene glycols or diglycols described as applicable herein or specifically of any of those named above.

Therefore, to avoid prolixity and unduly physically lengthening this specification, as further illustrative examples each of the foregoing illustrative examples is referred to as if repeated in full but in each case by its ketone replaced, in part or as a whole, respectively by the same weight of each of the other ketones named herein, then also as to any of these examples by its coupling agent similarly replaced by the same weight of each of the other coupling agents named herein; and similarly also as to each of these various examples with its wetting agent or either one of any two of them likewise replaced; and finally also with any of all of these examples, with its kerosene similarly replaced by any other of the solvent vehicles specifically named herein; and in each such case as if such different example actually was written out in full herein.

Depending on any particularly preferred or required practical operating conditions in any particular spray booth operation, or indicated to be needed water curtain conditions, the specific proportions of the specific two or more ingredients of any of the foregoing illustrative examples may be varied within the hereinabove respectively indicated corresponding ranges for any of them respectively. The various percentages recited are by weight.

The paint-coagulator compositions of the invention are effective for use with the overspray from a wide variety of types of paints, particularly those employed in modern painting practice and especially in large scale spray operations. Illustrative of such paints are acrylic resin-base paints, oil type-alkyd enamels, oil-, rubber-, or water-base paints of various synthetic resin, lacquer or glyceride oil film-forming type, the epoxy resin type as well as the mineral resin type, with only some few exceptions among the latter two.

Thus, the term "paint" as used herein, for example, in the expression "paint-coagulator" or in referring to the paints whose overspray is destroyed by a composition of this invention, is used in the broad sense so as to refer broadly to all such types of paints.

There are no special points as to the manner of use of the paint-coagulator compositions of the invention. Present indications are that generally satisfactory operation results from starting out by using from about one quarter of an ounce to about one ounce (by weight) of the selected paint-coagulator composition of the invention, of quantitative constitution illustrated by the examples herein, per gallon of water to be circulated to provide the water curtain to catch the overspray. The just indicated starting quantity is poured on top of the water in the tank in which is received the water curtain runoff with the overspray drawn down with it.

Make-up depends on the care which the operator exercises in conducting the operation. It could be as little as about one-quarter gallon per full working day per thousand gallons of water in the operation.

The compositions of Examples 1 and 2 show that it is not essential that every paint-coagulator composition of the invention contain a coupling agent and even when a wetting agent component is included. Thus, while some of the compositions then contain no coupling agent, when one is included, its content always should be lower than the amount that will allow the solution of the ketone in the solvent to form a stable emulsion with water.

Then too, to assure having a practically effective content of the solvent vehicle, it is advisable that the coupling agent content should not exceed 50% by weight and better that it be held significantly below that. Usually, it is best that its content not exceed about 30%, and no practical advantage accrues from having it exceed about 20%. Generally, regularly good results are obtained with coupling agent content within about 6%.

Desirably effective among the nonionic wetting agents or surfactants of the octyl to nonyl phenoxy (ethylenoxy)$_n$ ethanol type, also is nonylphenoxy polyoxyethylene ethanol, currently available under the commercial identification Igepal CO 430 (of Antara Chemicals). Also applicable among the nonionic wetting agents of predominately lipophilic yet significantly hydrophilic type are those which are condensates of ethylene oxide and polypropylene glycol available under the designation Pluronic such as the low foaming Pluronic L62 and L64, of average molecular weight of 2500 and 2900 respectively.

In the appended claims references to parts are by weight except if otherwise recited.

While the invention has been explained by detailed description of certain specific embodiments of it, it is understood that various modifications and substitutions may be made in them within the scope of the appended claims which are intended to cover also equivalents of them.

What is claimed is:
1. A liquid paint-coagulator composition which by weight consists essentially of
   (a) from about 3 to about 35 parts of a dialkyl ketone having a total of from 8 to about 35 carbon atoms and being dissolved in
   (b) from about 96 to about 60 parts of an organic solvent vehicle which dissolves said ketone without reacting with it and is a member of the class of the liquid solvents consisting of (i) aliphatic hydrocarbons, (ii) mono-nuclear aromatic hydrocarbons, (iii) chlorinated aliphatic hydrocarbons, and (iv) mixtures of any of these solvents, said organic solvent vehicle being insoluble in water and lighter than it and giving the resulting composition a flash point of at least about 100° F.; said overall composition being liquid, substantially insoluble in water and lighter than it to form a layer over it, and effective to destroy the tacky film-forming property of and coagulate paint-spray booth overspray paint particles.

2. A liquid composition as claimed in claim 1, wherein there are from about 6 to about 15 parts of said ketone dissolved in from about 96 to about 85 parts of the solvent vehicle for it.

3. A liquid composition as claimed in claim 2, wherein the solvent vehicle is a mixture of aliphatic and aromatic members of said class of liquid solvents and is predominately aliphatic.

4. A liquid composition as claimed in claim 2, which contains also up to about four parts of a wetting agent component which is predominately nonionic, and also predominately lipophilic and possesses also a significant hydrophilic activity.

5. A liquid composition as claimed in claim 4, wherein at least about one-half of the wetting agent component is a low-foaming wetting agent.

6. A liquid composition as claimed in claim 4, which contains, as a coupling agent, up to about 30 parts by weight of a glycol ether member of the class consisting of the mono- and di-(lower)alkyl ethers of mono- and di-(lower)alkylene glycols and diglycols.

7. A liquid composition as claimed in claim 6, which contains up to about 6 parts of said glycol ether.

8. A liquid composition as claimed in claim 7, wherein the glycol ether is a lower alkyl dialkylene glycol ether.

9. A liquid composition as claimed in claim 8, wherein the glycol ether is diethylene glycol monobutyl ether.

10. A liquid composition as claimed in claim 2, wherein the solvent vehicle consists essentially of kerosene.

11. A liquid composition as claimed in claim 10, wherein the ketone has a total of nine carbon atoms.

12. A liquid composition as claimed in claim 11, which contains about 87 parts of said solvent vehicle.

13. A liquid composition as claimed in claim 12, which contains about 9 parts of the ketone.

14. A liquid composition as claimed in claim 13, which contains also about 1 part of a nonionic, predominately lipophilic and low-foaming wetting agent component which possesses also significant hydrophilic activity.

15. A liquid composition as claimed in claim 14, which contains also about 3 parts of a glycol ether member of the class consisting of ethylene glycol monobutyl ether and diethylene glycol monobutyl ether.

16. A paint-spray booth overspray paint coagulator consisting essentially of about 9 parts of diisobutyl ketone, about 87 parts of a lighter than water and water-insoluble aliphatic hydrocarbon solvent for said ketone and consisting predominately of kerosene and having such flash point that said composition has a flash point of at least about 105° F.; about 1 part of a nonionic, predominately lipophilic and low-foaming wetting agent component which possesses also significant hydrophilic activity; and about 3 parts of a monobutyl ether of a member of the class consisting of mono-ethylene and diethylene glycols; all of said foregoing parts being by weight.

17. A composition effective as a paint-coagulator and to destroy the tacky film-forming property of paint-spray booth overspray paint particles and consisting essentially of about nine parts of diisobutyl ketone, about eighty-seven parts of kerosene, about three parts of ethylene glycol mono-butyl ether, about one-half part of octylphenoxy ethylenoxy phenyl ether, and about one-half part of the nonionic wetting agent alkylphenoxy (ethylenoxy)$_n$ ethanol wherein alkyl is at least one of octyl and nonyl, and $n$ is one to two; all of said foregoing parts being by weight.

18. A composition effective as a paint-coagulator and to destroy the tacky film-forming property of paint-spray booth overspray paint particles and consisting essentially of about nine parts of diisobutyl ketone, about eighty-seven parts of kerosene, and about one part of the nonionic wetting agent alkylphenoxy (ethylenoxy)$_n$ ethanol wherein alkyl is at least one of octyl and nonyl, and $n$ is one to two; all of said foregoing parts being by weight.

19. The composition as claimed in claim 18, which includes also about three parts of diethylene glycol monobutyl ether.

20. The composition as claimed in claim 19, wherein the alkylphenoxy (ethylenoxy)$_n$ ethanol is present to the extent of about one-half part, and there is included also about one-half part of octylphenoxy ethylenoxy phenyl ether.

21. The composition as claimed in claim 17, wherein the diisobutyl ketone is replaced by methyl heptyl ketone.

References Cited

UNITED STATES PATENTS

| | | | |
|---|---|---|---|
| 2,315,125 | 3/1943 | Meckler | 106—287 |
| 2,982,723 | 5/1961 | Arnold et al. | 106—287 |
| 2,968,638 | 1/1961 | Meckler | 106—287 |
| 3,131,153 | 4/1964 | Klausner | 252—170 X |
| 2,970,958 | 2/1961 | Shapiro | 252—8.55 |
| 2,100,425 | 11/1937 | Bent et al. | 252—364 |

LEON D. ROSDOL, *Primary Examiner.*

W. SCHULZ, *Assistant Examiner.*

U.S. Cl. X.R.

106—287; 134—38; 252—364